United States Patent
Dangui et al.

(10) Patent No.: US 9,705,599 B2
(45) Date of Patent: Jul. 11, 2017

(54) SYSTEMS FOR IMPROVED SPECTRAL EFFICIENCY IN MULTI-CARRIER COMMUNICATION SYSTEMS

(71) Applicant: Google Inc., Mountain View, CA (US)

(72) Inventors: Vinayak Dangui, Santa Clara, CA (US); Bikash Koley, Sunnyvale, CA (US); Vijay Vusirikala, Palo Alto, CA (US); Ralph Theodore Hofmeister, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/813,756

(22) Filed: Jul. 30, 2015

(65) Prior Publication Data
US 2017/0033870 A1 Feb. 2, 2017

(51) Int. Cl.
*H04B 10/00* (2013.01)
*H04B 10/40* (2013.01)
(Continued)

(52) U.S. Cl.
CPC .......... *H04B 10/40* (2013.01); *H04B 10/43* (2013.01); *H04B 10/63* (2013.01); *H04J 14/02* (2013.01)

(58) Field of Classification Search
USPC ........................................ 398/140, 202–214
See application file for complete search history.

(56) References Cited

U.S. PATENT DOCUMENTS 5,321,543 A * 6/1994 Huber .............. H04B 10/5051
398/194
5,546,190 A * 8/1996 Hill ...................... H04B 10/60
398/205
(Continued)

FOREIGN PATENT DOCUMENTS

CN 103297169 A 9/2013

OTHER PUBLICATIONS

Liu, et al. Joint digital signal processing for superchannel coherent optical communication systems, Optics Express, vol. 21, No. 7, pp. 8342-8356, Apr. 3, 2013.
(Continued)

*Primary Examiner* — Agustin Bello
(74) *Attorney, Agent, or Firm* — McDermott Will & Emery LLP

(57) ABSTRACT

This disclosure provides systems, methods, and apparatus for improving spectral efficiency of a communication system. The communication system can include a transmitter, a receiver and a communication link for communicating data between the transmitter and the receiver. The transmitter can employ a multi-carrier technique to transmit data to the receiver. The transmitter can generate a plurality of carrier signals using a receiver-side comb generator, one of which is sent to the transmitter as a pilot carrier signal combined with modulated carrier signals over an optical link. At the receiver the receiver-side comb generator uses the pilot carrier signal to generate a plurality of receiver-side carrier signals, which are used for detecting the modulated carrier signals. As the phase noise in the modulated carrier signals and the phase noise in the receiver-side carrier signals have the same characteristics, the phase noise is cancelled at the receiver, resulting in improved detection.

13 Claims, 5 Drawing Sheets

(51) Int. Cl.
  *H04B 10/43* (2013.01)
  *H04B 10/63* (2013.01)
  *H04J 14/02* (2006.01)

(56) References Cited

U.S. PATENT DOCUMENTS

| | | | | |
|---|---|---|---|---|
| 5,596,436 | A * | 1/1997 | Sargis | H04J 14/0298 398/76 |
| 6,370,156 | B2 * | 4/2002 | Spruyt | H04L 27/261 370/206 |
| 6,493,131 | B1 * | 12/2002 | Tarng | H04B 10/503 359/240 |
| 6,603,822 | B2 * | 8/2003 | Brede | G06F 17/14 348/E7.07 |
| 6,912,233 | B2 * | 6/2005 | Spruyt | H04L 27/261 370/430 |
| 7,043,271 | B1 * | 5/2006 | Seto | H01Q 3/2605 398/58 |
| 7,123,402 | B1 * | 10/2006 | Doerr | H04J 14/02 359/326 |
| 7,146,103 | B2 * | 12/2006 | Yee | H04B 10/2507 398/152 |
| 7,209,660 | B1 * | 4/2007 | Yee | H04B 10/50 398/141 |
| 7,346,279 | B1 * | 3/2008 | Li | H04B 10/40 398/155 |
| 7,426,249 | B2 * | 9/2008 | Keaney | H03M 13/3961 375/265 |
| 7,447,436 | B2 * | 11/2008 | Yee | H04B 10/50 398/152 |
| 7,561,807 | B2 * | 7/2009 | Doerr | H04B 10/60 359/326 |
| 7,620,318 | B2 * | 11/2009 | Li | H04B 10/40 398/155 |
| 8,681,916 | B2 * | 3/2014 | Braz | H04L 7/06 370/464 |
| 8,699,880 | B2 | 4/2014 | Grigoryan et al. | |
| 8,787,767 | B2 * | 7/2014 | Wilkinson | H04B 10/548 398/140 |
| 2006/0176968 | A1 * | 8/2006 | Keaney | H03M 13/3961 375/260 |
| 2006/0198449 | A1 * | 9/2006 | De Bart | H04L 25/0236 375/260 |
| 2007/0166048 | A1 * | 7/2007 | Doerr | H04B 10/60 398/158 |
| 2008/0145063 | A1 * | 6/2008 | Li | H04B 10/40 398/140 |
| 2010/0178057 | A1 * | 7/2010 | Shieh | H04L 25/0224 398/79 |
| 2011/0123197 | A1 * | 5/2011 | Taylor | H04J 14/02 398/79 |
| 2013/0107341 | A1 * | 5/2013 | Zeng | H04B 10/548 359/238 |
| 2013/0108271 | A1 * | 5/2013 | Tang | H04L 7/0008 398/66 |
| 2013/0170333 | A1 * | 7/2013 | Yun | H04J 11/00 370/208 |
| 2013/0188677 | A1 * | 7/2013 | Howard | H04B 7/0421 375/219 |
| 2014/0064734 | A1 * | 3/2014 | Witzens | H04B 10/64 398/79 |
| 2014/0205286 | A1 * | 7/2014 | Ji | H04B 10/40 398/45 |
| 2015/0016827 | A1 * | 1/2015 | Wilkinson | H04B 10/548 398/183 |
| 2015/0207567 | A1 * | 7/2015 | Bogoni | H04B 10/90 398/115 |
| 2015/0341123 | A1 * | 11/2015 | Nagarajan | H04B 10/70 398/43 |
| 2016/0043810 | A1 * | 2/2016 | Quinlan | H04B 10/90 398/208 |
| 2017/0033870 | A1 * | 2/2017 | Dangui | H04B 10/40 |

OTHER PUBLICATIONS

Smith, Mat. Researchers have broken the capacity limits of fiber optic networks, Engadget.com, Jul. 29, 2015, URL: http://www.engadget.com/2015/06/29/limits-of-fiber-optics-broken/.

Torres-Company, et al. Optical frequency comb technology for ultrabroadband radio-frequency photonics, Laser & Photonics Reviews, vol. 8, No. 3, 2014.

Extended European Search Report dated Dec. 19, 2016 in European Patent Application No. 16181939.6.

Bordonalli, Aldario Chrestani, et al. Optical injection locking to optical frequency combs for superchannel coherent detection, Optics Express, vol. 23, No. 2, pp. 1547-1557, Jan. 26, 2015.

Hu, Rong, et al. Direct-detection optical OFDM superchannel for long-reach PON using pilot regeneration, Optics Express, vol. 21, No. 22, pp. 26513-26519, Nov. 4, 2013.

Liu, Lilong, et al. Chromatic dispersion compensation using two pilot tones in optical OFDM systems, Optical Transmission Systems, Subsystems, and Technologies IX, Proceedings of SPIE-OSA-IEEE Asia Communications and Photonics, SPIE vol. 8309, No. 830937 (2011).

Liu, Sicong, et al. Investigation of Pilot-aided phase noise compensation in CO-OFDM System, Asia Communications and Photonics Conference and Exhibition, 2 pages, Dec. 8, 2010.

Yi Xingwen, et al. Tb/s Coherent Optical OFDM Systems Enabled by Optical Frequency Combs, Journal of Lightwave Technology, vol. 28, No. 14, pp. 2054-2061, Jul. 15, 2010.

International Search Report and Written Opinion mailed Oct. 12, 2916 in International Application No. PCT/US2016/044550 (15 Pages).

* cited by examiner

SYSTEMS FOR IMPROVED SPECTRAL EFFICIENCY IN MULTI-CARRIER COMMUNICATION SYSTEMS

TECHNICAL FIELD

This disclosure relates to the field of communication networks, and in particular to communication links and systems.

DESCRIPTION OF THE RELATED TECHNOLOGY

Communication systems, such as optical communication systems, include transmitters and receivers for communicating data over communication links High bandwidth data transmission communication systems typically employ higher order modulation techniques for transmitting data to the receiver. The communication link may introduce noise and other undesirable artifacts in the data transmitted between the transmitter and the receiver.

SUMMARY

According to one aspect, the subject matter described in this disclosure relates to an optical transceiver including an optical transmitter and an optical receiver coupled to an optical link. The optical transmitter includes a transmitter-side optical comb generator configured to generate a plurality of transmitter-side carrier signals, the plurality of transmitter-side carrier signals being equally spaced in frequency. The optical transmitter further includes a modulator configured to modulate data over each of a first subset of the plurality of transmitter-side carrier signals to generate a plurality of transmitter-side modulated carrier signals. The optical transmitter is is configured to transmit the plurality of transmitter-side modulated carrier signals and a second subset of the plurality of transmitter-side carrier signals over the optical link, where the second subset is disjoint from the first subset. The optical receiver is configure to receive a pilot carrier signal and a plurality of received modulated carrier signal. The optical receiver includes a receiver-side optical comb generator configured to utilize the pilot carrier signal to generate a plurality of receiver-side carrier signals, where the plurality of receiver-side carrier signals are equally spaced in frequency, and where each of the plurality of receiver-side carrier signals has the same frequency as one of the plurality of received modulated carrier signals. The optical receiver further includes a plurality of optical mixers, each optical mixer configured to mix one of the plurality of receiver-side carrier signals with a corresponding one of the plurality of received modulated carrier signals to generate a set of output signals. The optical receiver further includes a demodulator configured to demodulate the set of output signals to generate output data.

According to another aspect, the subject matter described in this disclosure relates to an optical receiver coupled to an optical link and receiving a plurality of modulated carrier signals and a pilot carrier signal over the optical link. The optical receiver includes a receiver-side optical comb generator configured to utilize the pilot carrier signal to generate a plurality of receiver-side carrier signals, where each of the plurality of receiver-side carrier signals has the same frequency as a carrier frequency of one of the plurality of modulated carrier signals. The optical receiver further includes a plurality of optical mixers, each optical mixer configured to mix one of the plurality of receiver-side carrier signals with a corresponding one of the plurality of modulated carrier signals to generate a set of output signals, and a demodulator configured to demodulate the set of output signals to generate output data.

According to another aspect, the subject matter described in this disclosure relates to a method for communicating optical signals. The method includes receiving a plurality of modulated carrier signals over an optical link. The method further includes receiving an unmodulated carrier signal over the optical link. The method also includes generating a plurality of receiver-side carrier signals using a comb generator, which in turn uses the unmodulated carrier signal as a seed signal. The method further includes demodulating the plurality of modulated carrier signals using the plurality of receiver-side carrier signals.

According to another aspect, the subject matter described in this disclosure relates to a method for communicating data over communication system including an optical transmitter and an optical receiver communicating over a communication link. The method includes Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Figure 1:
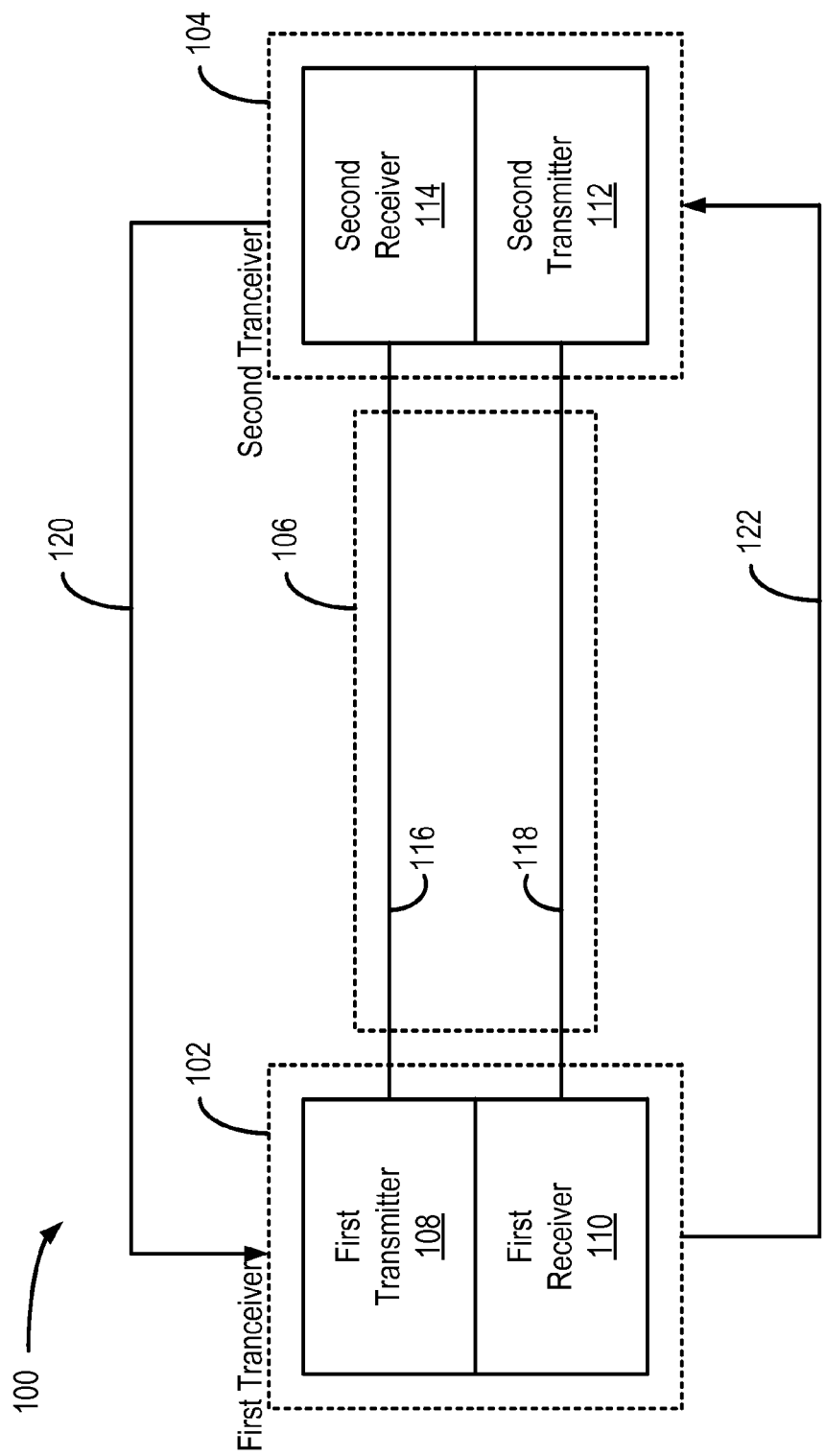
FIG. 1 shows an example communication system.

FIG. 1 shows an example communication system 100. In particular, the communication system 100 includes a first transceiver 102 communicating with a second transceiver 104 over a communication link 106. Each of the first transceiver 102 and the second transceiver 104 can be coupled to their respective devices, such as network switches, computers, data-storage devices, network interface cards, host-bus adapters, etc. The first and the second transceivers 102 and 104 can provide communication between their respective devices. In some implementations, the communication link 106 can include wired or wireless communication links. In some implementations, the communication link 106 can include optical links.

The first transceiver 102 can include a first transmitter 108 and a first receiver 110. Similarly, the second transceiver 104 can include a second transmitter 112 and a second receiver 114. The first transmitter 108 can communicate with the second receiver 114 over a first communication link 116, while the second transmitter 112 can communicate with the first receiver 110 over a second communication link 118. In some implementations, the first transceiver 102 and the second transceiver 104 can communicate over out-of-band links. For example, first transceiver 102 can communicate with the second transceiver 104 over a first out-of-band communication link 120 and over a second out-of-band communication link 122. In some implementations, the first and the second out-of-band communication links 120 and 122 can be utilized to communicate management data associated with the communication system 100.

In some implementations, the communication link 106 can be an optical communication link. For example, the first communication link 116 and the second communication link 118 can include optical fibers for carrying optical signals. The first transmitter 108 and the second transmitter 112 can each include circuitry for transmitting optical signals representative of the data being transmitted over the communication links 116 and 118 respectively. Similarly, the first receiver 110 and the second receiver 114 can include circuitry for receiving and processing the optical signals transmitted by the first transmitter 108 and the second transmitter 112, respectively, to extract the data.

The spectral efficiency of a communication system is generally described in terms of data throughput divided by the bandwidth used to transmit that data. In some implementations, the spectral efficiency of a communication system can be improved by using multi-carrier transmission systems. In multi-carrier transmission systems, multiple carriers at different frequencies can be individually modulated with separate data streams and transmitted to the receiver simultaneously. Generally, the multiple carriers are spaced at regular intervals in the frequency domain. In some implementations, to minimize inter-channel-interference between adjacent carriers, the carriers are separated by at least the baud rate of the data being transmitted on the carriers. In some implementations, the channel separation can be maintained at or below the baud rate (also known as Nyquist or sub-Nyquist spacing) to further improve the spectral efficiency. For example, carrier signals generated by comb generators, which exhibit good stability in maintaining substantially constant frequencies of the carrier signals, can be spaced with sub-Nyquist spacing without significant increase in inter-channel-interference. However, factors such as noise, chromatic dispersion, and non-linearity, can contribute in limiting the extent to which the channel separation can be reduced. The communication systems discussed below in FIGS. 2-4 mitigate the effects of phase noise on optical transmission signals, thereby allowing improvement in the spectral efficiency of the communication systems.

Figure 2:
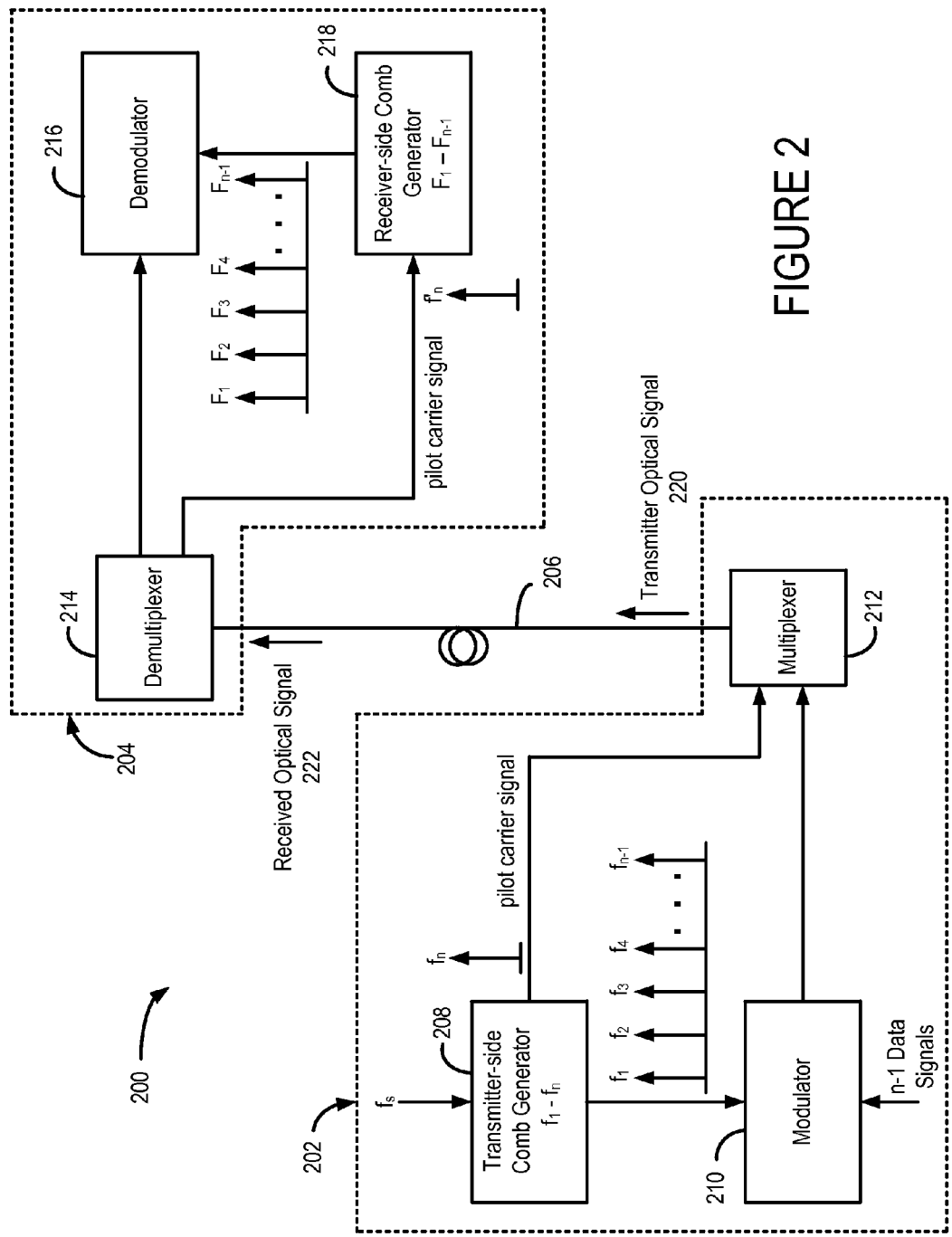
FIG. 2 shows another example communication system.

FIG. 2 shows another example communication system 200. In particular, the communication system 200 includes a transmitter 202, a receiver 204, and an optical link 206 communicably connecting the transmitter 202 and the receiver 204. The transmitter 202 includes a transmitter-side comb generator 208, a modulator 210, and a multiplexer 212. The receiver 204 can include a demultiplexer 214, a demodulator 216, and a receiver-side comb generator 218. As discussed in further detail below, the transmitter-side comb generator 208 generates a plurality of equally spaced optical carrier signals, which are modulated by the modulator 210. The modulated carrier signals can be multiplexed by the multiplexer 212 into a transmitter optical signal 220 for transmission over the optical link 206. One of the optical carrier signals generated by the transmitter-side comb generator 208 (referred to as a "pilot carrier signal") also can be included in the transmitter optical signal 220 to be transmitted over the optical link 206. At the receiver 204 side, the pilot carrier signal is used to seed the receiver-side comb generator 218 to generate a plurality of frequency locked optical signals having the same set of frequencies as that generated by the transmitter-side comb generator 208. The optical signals generated by the receiver-side comb generator 218 are fed to the demodulator 216, which utilizes these optical signals to demodulate the received modulated carrier signals. As the seed signal used by the receiver-side comb generator 218 includes the same phase noise as the received carrier signals, this phase noise can be substantially canceled in the demodulated signal. Additional details of the transmitter 202 and the receiver 204 are discussed below.

The transmitter-side comb generator 208 receives a seed frequency signal $f_s$ as an input and generates a plurality of equally spaced carrier signals $f_1$-$f_n$. In some implementations, the seed frequency signal can be provided using a single laser source, such as a laser diode. One or more of the plurality of carrier signals $f_1$-$f_n$ are selected as pilot signals to be transmitted to the receiver 204 end without being modulated by the modulator 210. For example, as shown in FIG. 2, carrier signals $f_1$-$f_{n-1}$ are fed to the modulator 210, while the carrier signal $f_n$ (the "pilot carrier signal") is fed directly to the multiplexer 212 instead of being fed to the modulator 210. It is understood that any of the plurality of carrier signals $f_1$-$f_n$ can be sent unmodulated as pilot carrier signals to the multiplexer 212 for transmission over the optical link 206. In some implementations, the transmitter-side comb generator 208 can generate and feed the carrier signals $f_1$-$f_n$ onto a single waveguide or fiber to the modulator 210. In some such implementations, a demultiplexer can be utilized to separate the carrier frequencies onto multiple optical fibers, each fiber providing the carrier signal to the modulator 210. In some implementations, the transmitter-side comb generator 208 can be implemented using techniques such as external injection of gain switched (directly modulated) laser diodes, such as Fabry-Perot laser diodes. In some other implementations, the transmitter-side comb generator 208 can be implemented using techniques utilizing multistage parametric mixer designs seeded by a single master laser.

The modulator 210 can include a plurality of modulators for modulating the optical carrier signals $f_1$-$f_{n-1}$ with data signals. For example, each modulator can modulate each of the optical carrier signals $f_1$-$f_{n-1}$ with one of n−1 data signals received by the transmitter 202. Thus, the modulator 210 can generate n−1 modulated optical carrier signals. The n−1 data signals can represent the data to be transmitted to the receiver 204. In some implementations, the n−1 data signals can represent n−1 separate and independent data streams, respectively. In some implementations, the n−1 data signals may be derived from a single data stream. In some implementations, at least two of the n−1 data signals can represent the same data stream. In some implementations, electro-optic modulators, such as, for example, Mach-Zehnder modulators (MZMs), can be utilized for modulating each of the carrier signals $f_1$-$f_{n-1}$ with a data signal. In some other implementations, the modulator 210 can include resonant ring oscillators based modulators, or any other suitable optical or electro-optical modulator. In some implementations, modulators other than electro-optic modulators, such as, without limitation, acousto-optic modulators, magneto-optic modulators, mechano-optic modulators, thermo-optic modulators, or combinations thereof, also can be utilized. In some implementations, the modulator 210 can utilize techniques such as quadrature amplitude modulation (QAM) and phase shift keying (PSK) for modulating the carrier signals.

The multiplexer 212 can multiplex the n−1 modulated optical carrier signals provided by the modulator 210, and the unmodulated pilot carrier signal $f_n$ into a single transmitter optical signal 220, which is transmitted over the optical link 206 to the receiver 204. In some implementations, the multiplexer 212 can be implemented using an optical signal combiner that combines the n−1 modulated signals, and the pilot carrier signal $f_n$ into a transmitter optical signal 220 for transmission over the optical link 206.

In some implementations, the combiner can be a dichroic combiner, which combines optical signals of different frequencies into a single optical beam. In some implementations, an optical add-drop multiplexer can be utilized for combining the n−1 modulated carrier signals and the pilot carrier signals into the transmitter optical signal 220. In some implementations, any device that can combine the two or more optical signals into a single optical signal can be utilized to implement the combiner. In some implementations, the combiner can include filters to selectively combine a portion of the spectrum of the input optical signals to generate a combined optical signal.

The optical link 206 can be similar to the communication link 106 discussed above in relation to FIG. 1. In some implementations, the optical link 206 can be implemented using optical fibers such as single mode fibers (SMFs), multi-mode fiber (MMFs), etc. In some implementations, the optical link 206 can introduce undesired signal loss, nonlinear effects, and dispersion in the optical signals that are transmitted over it. In particular, the optical link 206 can introduce non-linear phase noise in the modulated carrier signals and the unmodulated pilot carrier signal $f_n$. As both the transmitter optical signal 220 and the pilot carrier signal are transmitted over the same optical link 206, the non-linear phase noise introduced in modulated carrier signals can have the substantially same characteristics as the non-linear phase noise introduced in the unmodulated pilot carrier signal $f_n$.

The transmitter optical signal 220 transmitted over the optical link 206 is received as a received optical signal 222 at the receiver 204. The demultiplexer 214 demultiplexes the received optical signal 222 into the n−1 modulated optical carrier signals and the pilot carrier signal $f'_n$. The demultiplexing techniques utilized by the demultiplexer 214 can complement the multiplexing techniques used at the transmitter 202 to multiplex the modulated carrier signals and the unmodulated pilot carrier signal (for example, by the multiplexer 212 shown in FIG. 2). In some implementations, an arrayed waveguide grating (AWG) can be utilized for demultiplexing received optical signal 222. In some other implementations, a reconfigurable optical add-drop demultiplexer can be utilized for demultiplexing the signals. In some implementations, an optical splitter can be utilized for separating the received modulated signals and the pilot carrier signal. The demultiplexed n−1 modulated optical carrier signals can be provided to the demodulator 216 while the demultiplexed pilot carrier signal $f'_n$ can be provided to the receiver-side comb generator 218.

The receiver-side comb generator 218 can be similar to the transmitter-side comb generator 208, shown in FIG. 2, in that the receiver-side comb generator 218 generates optical carrier signals having the same set of frequencies as the optical carrier signals generated by the transmitter-side comb generator 208. However, the receiver-side comb generator 218 generates the set of optical carrier signals using the received pilot carrier signal $f'_n$ as a seed optical signal. Specifically, the receiver-side comb generator 218 generates at least a set of receiver carrier signals $F_1$-$F_{n-1}$ using the pilot carrier signal $f'_n$. The receiver carrier signals $F_1$-$F_{n-1}$ have frequencies that are equal to the frequencies of the carrier signals $f_1$-$f_{n-1}$, respectively, generated by the transmitter-side comb generator 208. Further, the set of carrier signals $F_1$-$F_{n-1}$ generated by the receiver-side comb generator 218 have the same phase noise characteristics as the received pilot carrier signal $f'_n$.

The demodulator 216 receives the n−1 modulated carrier signals from the demultiplexer 214 and the carrier signals $F_1$-$F_{n-1}$ from the receiver-side comb generator 218. In some implementations, the demodulator 216 can utilize coherent detection techniques for detecting and demodulating the received modulated carrier signals. Coherent detection techniques allow detection of both amplitude and phase of the modulated optical signal, as opposed to direct detection techniques which only detect the amplitude of the modulated optical signal. The additional information on the phase of the modulated optical signal in coherent detection allows improved recovery of the modulated optical signal. One example of such a receiver is discussed below in relation with FIG. 3.

Figure 3:
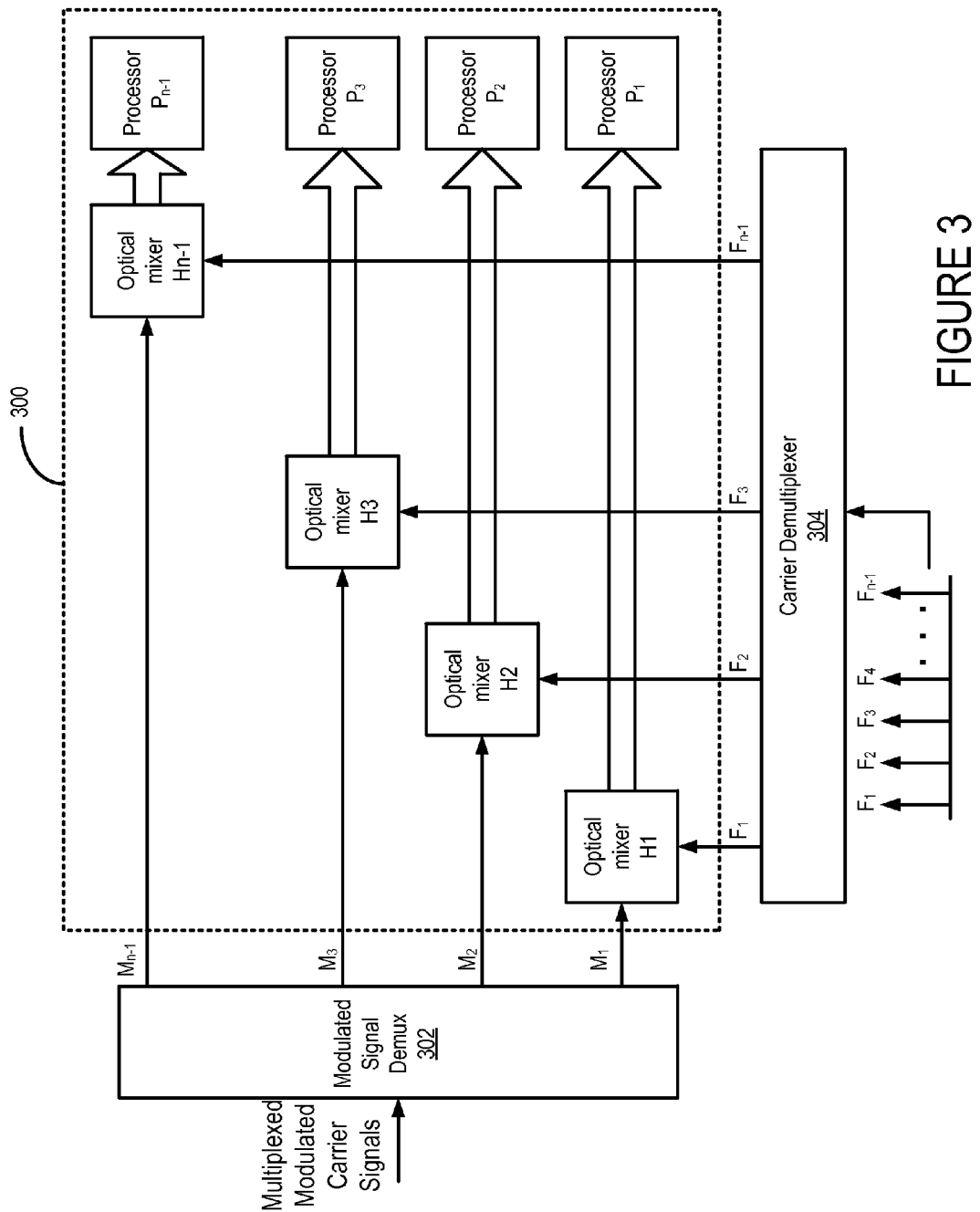
FIG. 3 shows a block diagram of an example the receiver.

FIG. 3 shows a functional block diagram of an example demodulator 300. The demodulator 300 can be used for implementing a demodulator in, for example, the receivers 110 and 114 shown in FIG. 1. The demodulator 300 also can be used for implementing the demodulator 216 shown in FIG. 2. In particular, the demodulator 300 includes a plurality of optical mixers $H_1$-$H_{n-1}$, and a plurality of processors $P_1$-$P_{n-1}$. The demodulator 300 can receive demultiplexed n−1 modulated carrier signals: $M_1$-$M_{n-1}$ from a demultiplexer 302. The demultiplexer 302 can be similar to the demultiplexer 214 shown in FIG. 2.

In some implementations, where the receiver-side comb generator 218 is configured to output the carrier signals $F_1$-$F_{n-1}$ in a multiplexed manner, a carrier demultiplexer 304 can be utilized. The carrier demultiplexer 304 can receive multiplexed comb carrier signals $F_1$-$F_{n-1}$ from a comb generator, such as the receiver-side comb generator 218 shown in FIG. 2, and can demultiplex these carrier signals to output demultiplexed carrier signals $F_1$-$F_{n-1}$. The carrier demultiplexer 304 can be implemented using any suitable technique that complements the multiplexing technique used by the receiver-side comb generator 218 for generating the carrier signals $F_1$-$F_{n-1}$. In some implementations, the carrier demultiplexer 304 can be implemented using an AWG. In some other implementations, where the receiver-side comb generator 218 generates the carrier signals $F_1$-$F_{n-1}$ on separate optical fibers, the carrier demultiplexer 304 may not be needed.

The outputs of the demultiplexer 302 and the carrier demultiplexer 304 are provided to the plurality of optical mixers $H_1$-$H_{n-1}$. For example, the first modulated carrier signal M1 and the first carrier signal F1 are provided to the first optical mixer H1, the second modulated carrier signal $M_2$ and the second carrier signal $F_2$ are provided to the second optical mixer $H_2$, and so on. Each optical mixer $H_1$-$H_{n-1}$ mixes a modulated carrier signal with a respective comb generated carrier signal to determine the amplitude and phase of the modulated carrier signal. Specifically, two of the four optical output signals generated by an optical mixer can be represented by a sum and a difference of the real portions of the modulated carrier signal and the comb generated carrier signal, and the remainder two of the four output signals can be represented by a sum and a difference of the imaginary portions of the modulated carrier signal and the comb generated carrier signal. As the phase noise characteristics of both the modulated carrier signal and the comb generated carrier signal are the same, the mixing operation of the optical mixer will cancel the phase noise when generating the output signals, as discussed in detail below. The output signals generated by the optical mixers $H_1$-$H_1$ are provided to processors $P_1$-$P_{n-1}$, which process the received signals to generate data. In some implementations, the optical mixers can be implemented using optical hybrids, such as 90° optical hybrids or 180° optical hybrids.

In some implementations, a modulated carrier signal received at the receiver 204 (such as any one of the n−1 modulated carrier signals transmitted by the transmitter 202 and received at the receiver 204 over the optical link 206) can have a phase noise $\phi_M$ expressed, for example, by the following equation:

$$\phi_M = \phi_{TX,LW} + \phi_{TX,F} + \phi_{NL} \tag{1}$$

where $\phi_{TX,LW}$ represents a linewidth phase noise component, $\phi_{TX,F}$ represents a frequency dependent phase noise component (which is a function, in part, of the frequency stability of the light source, and which is typically improved in a frequency comb), and $\phi_{NL}$ represents a nonlinear phase noise component. The linewidth phase noise component $\phi_{TX,LW}$ and the frequency dependent phase noise component $\phi_{TX,F}$ are generally associated with the transmitter-side comb generator 208 and the laser used for seeding the transmitter-side comb generator 208. The non-linear phase noise component $\phi_{NL}$ is generally associated with the non-linear phase noise introduced by the optical link 206.

As mentioned above, the receiver-side comb generator 218 generates the carrier signals $F_1$-$F_{n-1}$ based on the pilot carrier signal f′$_n$ received over the optical link 206. As the pilot carrier signals f also is generated by the same laser and comb generator (transmitter-side comb generator 208) as the carrier signals of the n−1 modulated carrier signals, the phase noise $\phi_P$ of the pilot carrier signal will have the same noise components as the phase noise of the modulated carrier signal received at the receiver 204. The receiver-side comb generator 218 uses the received pilot carrier signal f′$_n$ as a seed for generating the carrier signals $F_1$-$F_{n-1}$. Assuming that the phase noise introduced by the comb generation process of the receiver-side comb generator 218 is denoted by $\phi_{comb-process}$, the phase noise $\phi_{RX-CARRIER}$ associated with each of the carrier signals $F_1$-$F_{n-1}$ can be expressed, for example, by the following equation:

$$\phi_{RX-CARRIER} = \phi_{TX,LW} + \phi_{TX,F} + \phi_{NL} + \phi_{comb-process} \tag{2}$$

Different comb generation processes can have different phase noise $\phi_{comb-process}$ associated with them. For example, the phase noise associated a process utilizing external injection of gain switched laser diode can be different from the phase noise associated with a process utilizing multistage parameter mixer designs seeded by a single master laser for generating comb frequencies.

At the demodulator 216, the optical mixers $H_1$-$H_{n-1}$ mix the carrier signals $F_1$-$F_{n-1}$ with their corresponding modulated carrier signals $M_1$-$M_{n-1}$. The phase noise $\phi_{mixer}$ in an output signal of the optical mixers $H_1$-$H_{n-1}$ can be expressed, for example, by the following equations:

$$\phi_{mixer} = \phi_M - \phi_{RX-CARRIER} \tag{3}$$

$$\phi_{mixer} = \phi_{TX,LW} + \phi_{TX,F} + \phi_{NL} - \phi_{TX,LW} - \phi_{TX,F} - \phi_{NL} - \phi_{comb-process} \tag{4}$$

$$\phi_{mixer} \approx -\phi_{comb-process} \tag{5}$$

As the phase noise terms $\phi_{TX,LW}$, $\phi_{TX,F}$, and $\phi_{NL}$ are correlated, most of these phase noise terms cancel out, resulting in the phase noise $\phi_{mixer}$ at the output of the mixer to be approximately equal to the phase noise $\phi_{comb-process}$ introduced by the comb generation process.

In contrast, in implementations where the receiver-side comb generator 218 generates the carrier frequencies $F_1$-$F_{n-1}$ based not on the pilot carrier signal $F_n$ received from the transmitter 202, but instead on a locally generated seed signal, the resulting phase noise in the output signals of the mixers $H_1$-$H_{n-1}$ can be relatively larger. For example, the phase noise $\phi'_{RX-CARRIER}$ associated with any one of the carrier signals $F_1$-$F_{n-1}$ generated by the receiver-side comb generator 218 using a locally generated seed signal, can be expressed by the following equation:

$$\phi'_{RX-CARRIER} = \phi_{RX,LW} + \phi_{RX,F} + \phi_{comb-process} \tag{6}$$

where $\phi_{RX,LW}$ and $\phi_{RX,F}$ in Equation (6) represent the linewidth phase noise component and the frequency dependent phase noise component, respectively, associated with the laser and the receiver-side comb generator 218. As a result, the phase noise $\phi'_{mixer}$ at an output of the mixers $H_1$-$H_{n-1}$ can be expressed, for example, by the following equation:

$$\phi'_{mixer} = \phi_M - \phi'_{RX-CARRIER} \tag{7}$$

$$\phi'_{mixer} = \phi_{TX,LW} + \phi_{TX,F} + \phi_{NL} - \phi_{RX,LW} - \phi_{RX,F} - \phi_{comb-process} \tag{8}$$

As the phase noise terms $\phi_{TX,LW}$ and $\phi_{TX,F}$ are associated with the transmitter-side laser and comb generator 208, these noise terms are uncorrelated with the phase noise terms $\phi_{RX,LW}$, and $\phi_{RX,F}$, which are associated with the receiver-side laser and comb generator 218. As a result, unlike in Equation (4), these phase terms will not cancel out in Equation (8). Instead, these phase noise terms will result in an increase the variance of the phase noise $\phi'_{mixer}$ (compared to the phase noise $\phi_{mixer}$ shown in Equation (5)). Thus, comparing Equation (8) to Equation (5), it can be seen that the net phase noise at the output of the mixers $H_1$-$H_{n-1}$ when the receiver-side comb generator 218 uses the pilot carrier signal f′$_n$ received from the transmitter 202 as a seed signal is relatively smaller than that when the receiver-side comb generator 218 uses a locally generated seed signal. The resulting improvement in the phase noise can result in an improvement in the signal quality of the demodulated signals and, in turn, improvement in the error rates of the data generated from the demodulated signals.

Figure 4:
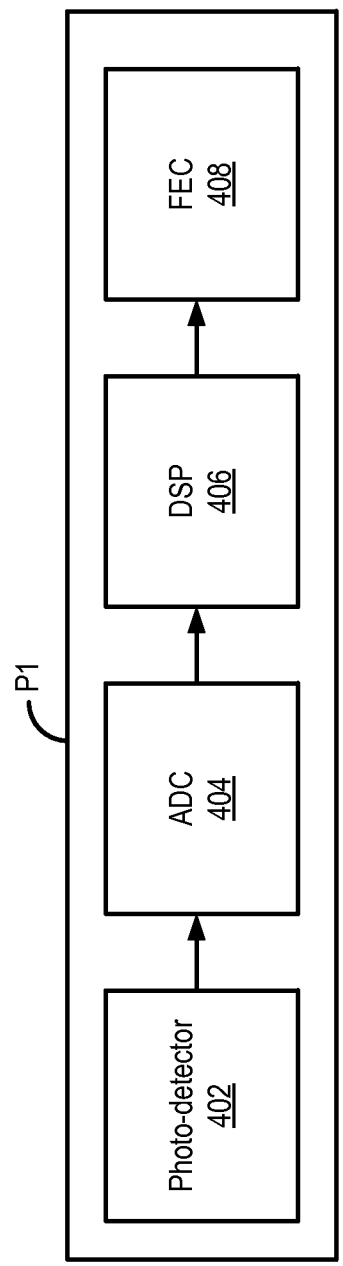
FIG. 4 shows an example block diagram of a processor shown in FIG. 3.

FIG. 4 shows an example block diagram of a processor $P_1$ shown in FIG. 3. In particular, the processor $P_1$ includes a photo-detector module 402, an analog-to-digital converter (ADC) 404, a digital signal processor (DSP) 406, and a forward error correction module (FEC) 408. The remainder of the processors $P_2$-$P_{n-1}$ shown in FIG. 3 can be similar to the processor $P_1$ shown in FIG. 4. The photo-detector module 402 includes at least two balanced photo detectors that convert the optical signals output by the hybrid mixer into electrical signals. The electrical signals generated by the photo-detector module 402 are digitized by the ADC module 404 and provided to the DSP 406. The DSP 406 processes and demodulates the digitized signals received from the ADC module 404 using demodulation algorithms that complement the modulation schemes used at the transmitter 202. In some implementations, the DSP 406 can further process the digital data to compensate for the effects of chromatic dispersion prior to demodulation. In some implementations, the DSP 406 can carry out additional filtering operations that may be needed to effectively generate the data transmitted by the transmitter 202.

In some implementations, to control errors in data transmission the transmitter 202 can encode the data intended for transmission. For example, the transmitter 202 can utilize forward error correction (FEC) codes such as block codes or convolutional codes to encode the data to be transmitted. In some such implementations, the output of the DSP 406 would also include encoded data. The FEC module 408 can decode the encoded data using the particular FEC codes used for encoding the transmitted data to detect any errors.

Referring again to FIG. 2, in some implementations, one of the carrier signals generated by the receiver-side comb generator 218 can be transmitted to the transmitter 202 side to be used as a seed signal $f_s$ for the transmitter-side comb generator 208. In some implementations, seeding each of the transmitter-side comb generator 208 and the receiver-side comb generator 218 with carriers generated by the other can improve synchronization of the carriers generated by these comb generators. This synchronization further improves recovery of the optical signal at the transmitter 202, and allows more room to reduce carrier separation, thereby improving the spectral efficiency of the communication system. In some implementations, where an optical network includes multiple optical links, a transmitter-receiver pair associated with each of a plurality of optical links can be synchronized. For example, in some implementations, a transceiver at one network node in the optical network can include a receiver that is synchronized with an up-link transmitter at a second node in the optical network, and include a transmitter that is synchronized with a down-link receiver at the second node. Optical links between other pairs of nodes can be synchronized similarly. As mentioned above, synchronization over an optical link can improve the spectral efficiency of the optical link. For an optical network, synchronization of multiple links within the optical network can improve the overall spectral efficiency of the optical network, thereby providing additional room to increase the bandwidth of the optical network.

Figure 5:
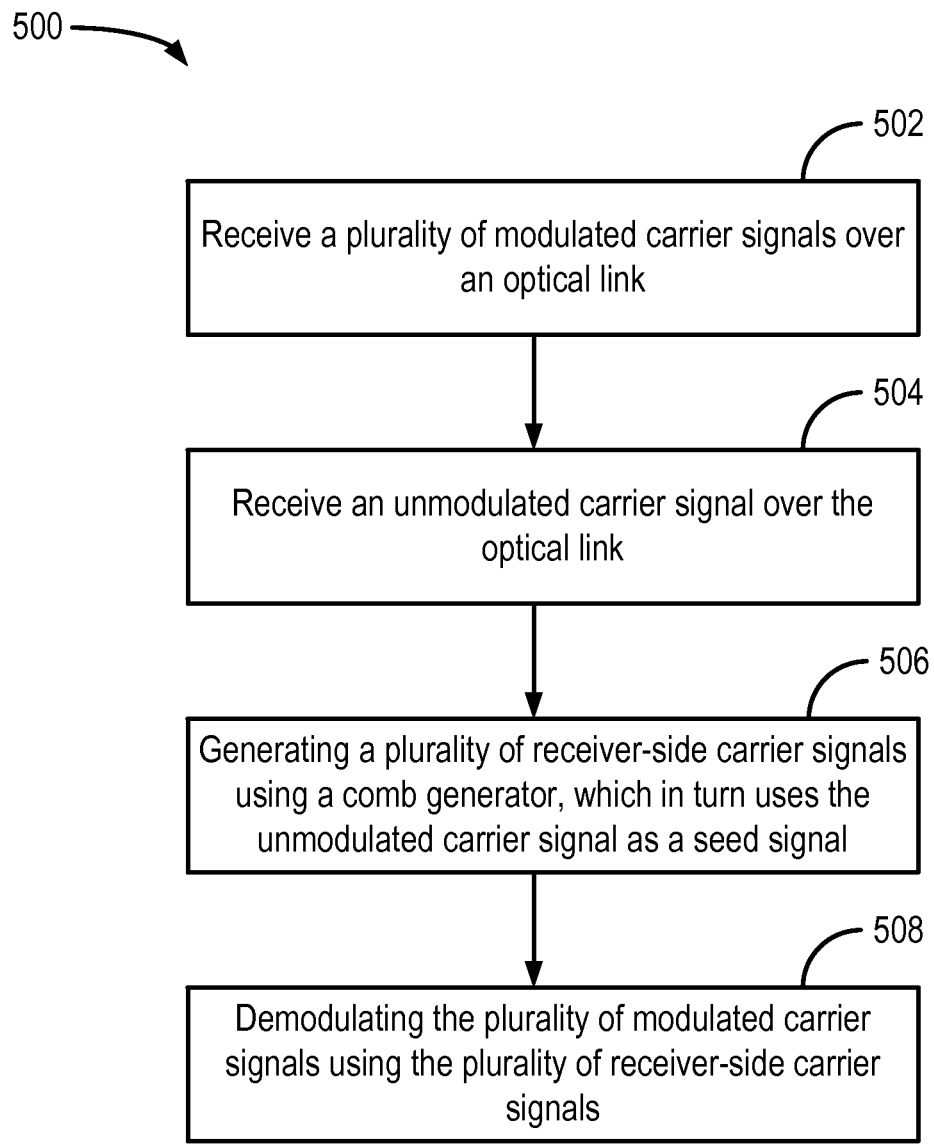
FIG. 5 shows a flow diagram of an example process for execution by a receiver, such as the receiver shown in FIG. 2.

FIG. 5 shows flow diagram of an example process 500 for execution by a receiver, such as the receiver 204 shown in FIG. 2. The process includes receiving a plurality of modulated carrier signals over an optical link (stage 502), receiving an unmodulated carrier signal over the optical link (stage 504), generating a plurality of receiver-side carrier signals using a comb generator, which in turn uses the unmodulated carrier signal as a seed signal (stage 506), and demodulating the plurality of modulated carrier signals using the plurality of receiver-side carrier signals (stage 508).

The process 500 includes receiving a plurality of modulated carrier signals over an optical link (stage 502). This process stage has been discussed above with reference to FIG. 2. For example, FIG. 2 shows a demultiplexer 214 receiving a multiplexed received optical signal 222 over the optical link 206. The multiplexed received optical signal 222 includes n−1 modulated carrier signals modulated by the modulator 210 at the transmitter 202. The process 500 further includes receiving an unmodulated carrier signal over the optical link (stage 504). One example, of this process stage has been discussed above in relation to FIG. 2. For example, as shown in FIG. 2, the receiver 204 receives the received optical signal 222, which includes an unmodulated carrier signal $f_n$.

The process 500 further includes generating a plurality of receiver-side carrier signals using a comb generator, which in turn uses the unmodulated carrier signal as a seed signal (stage 506). As discussed above in relation to FIG. 2, the receiver-side comb generator 218 generates receiver carrier signals $F_1$-$F_{n-1}$ using the received unmodulated carrier signal $f_n$ as a seed signal. The process 500 also includes demodulating the plurality of modulated carrier signals using the plurality of receiver-side carrier signals (stage 508). One example of this process stage has been discussed above in relation to FIG. 3. For example the demodulator 300 shown in FIG. 3 demodulates each of the modulated carrier signals $M_1$-$M_{n-1}$ using the receiver carrier signals $F_1$-$F_1$ generated by the receiver-side comb generator. The demodulator processes the demodulated signals to generate output data.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. An optical transceiver comprising:
   an optical transmitter coupled to an optical link, including:
      a transmitter-side optical comb generator configured to generate a plurality of transmitter-side carrier signals, the plurality of transmitter-side carrier signals being equally spaced in frequency, wherein:
         a frequency spacing between any two adjacent transmitter-side carrier signals is less than a baud rate of data modulated on each of a plurality of transmitter-side modulated carrier signals, and
         the transmitter-side optical comb generator generates the plurality of transmitter-side carrier signals using a first pilot carrier signal received from a remote transceiver to which the plurality of transmitter-side modulated carrier signals are transmitted,
      a modulator configured to modulate data onto each of a first subset of the plurality of transmitter-side carrier signals generated using the first pilot carrier signal to generate the plurality of transmitter-side modulated carrier signals,
      wherein the transmitter is configured to transmit the plurality of transmitter-side modulated carrier signals and a second subset of the plurality of transmitter-side carrier signals over the optical link, wherein the second subset is disjoint from the first subset;
   an optical receiver coupled to the optical link configured to receive a second pilot carrier signal and a plurality of received modulated carrier signals including:
      a receiver-side optical comb generator configured to utilize the second pilot carrier signal to generate a plurality of receiver-side carrier signals,
         wherein the plurality of receiver-side carrier signals are equally spaced in frequency,
         and
         each of the plurality of receiver-side carrier signals has the same frequency as one of the plurality of received modulated carrier signals,
      a plurality of optical mixers, each optical mixer configured to mix one of the plurality of receiver-side carrier signals with a corresponding one of the plurality of received modulated carrier signals to generate a set of output signals, and a demodulator configured to demodulate the set of output signals based on the respective amplitudes and phases of the output signals to generate output data.

2. The optical transceiver of claim 1, wherein the optical transmitter further includes a multiplexer configured to multiplex the plurality of transmitter-side modulated carrier signals and the second subset of the plurality of transmitter-side carrier signals over the optical link.

3. The optical transceiver of claim 1, wherein the optical receiver further includes a demultiplexer for demultiplexing the second pilot carrier signal and the plurality of received modulated carrier signals.

4. The optical transceiver of claim 1, wherein the demodulator is further configured to digitize the set of output signals and process the digitized set of output signals for chromatic dispersion compensation prior to demodulation.

5. An optical receiver coupled to an optical link and receiving a plurality of modulated carrier signals and a pilot carrier signal over the optical link, comprising:
  a receiver-side optical comb generator configured to utilize the pilot carrier signal to generate a plurality of receiver-side carrier signals, each receiver-side carrier signal having the same frequencies as respective modulated received modulated carrier signal, wherein a frequency spacing between any two adjacent receiver-side carrier signals is less than a baud rate of data modulated on each of the plurality of modulated carrier signals;
  a plurality of optical mixers, each optical mixer configured to mix one of the plurality of receiver-side carrier signals with a corresponding one of the plurality of modulated carrier signals to generate a set of output signals;
  a demodulator configured to demodulate the set of output signals based on the respective amplitudes and phases of the output signals to generate output data and
  a transmitter for transmitting one of the receiver side carrier signals as a second pilot carrier signal to a remote transmitter that transmits the modulated carrier signals.

6. The optical receiver of claim 5, further including a demultiplexer for demultiplexing the plurality of modulated carrier signals.

7. The optical receiver of claim 5, further comprising a carrier signal demultiplexer for demultiplexing the plurality of receiver-side carrier signals generated by the receiver-side optical comb generator.

8. The optical receiver of claim 5, wherein the demodulator is further configured to process the set of output signals for chromatic dispersion compensation prior to demodulation.

9. A method for communicating optical signals, comprising:
  receiving a plurality of modulated carrier signals over an optical link;
  receiving an unmodulated carrier signal over the optical link;
  generating a plurality of receiver-side carrier signals using an optical comb generator, which in turn uses the unmodulated carrier signal as a seed signal, wherein:
    a frequency spacing between any two adjacent receiver-side carrier signals is less than a baud rate of data modulated on each of the plurality of modulated carrier signals;
  demodulating the plurality of modulated carrier signals using the plurality of receiver-side carrier signals based on the respective amplitudes and phases of the respective modulated carrier signal; and
  optically communicating one of the generated receiver-side carrier signals to a remote transmitter from which the modulated carrier signal was received for use by the remote transmitter as a seed signal for a transmitter-side comb generator.

10. The method of claim 9, wherein receiving a plurality of modulated carrier signals over an optical link includes receiving the plurality of modulated carrier signals equally spaced in frequency.

11. The method of claim 9, wherein generating a plurality of receiver-side carrier signals using a comb generator includes generating the plurality of receiver-side carrier signals such that each of the plurality of receiver-side carrier signals has the same frequency as one of the plurality of modulated carrier signals.

12. The method of claim 9, further comprising demultiplexing the plurality of receiver-side carrier signals generated by the comb generator.

13. The method of claim 9, wherein demodulating the plurality of modulated carrier signals using the plurality of receiver-side carrier signals includes mixing each of the plurality of modulated carrier signals with a corresponding one of the plurality of receiver-side carrier signals using an optical mixer.

* * * * *